US006950424B2

United States Patent
Galand et al.

(10) Patent No.: US 6,950,424 B2
(45) Date of Patent: Sep. 27, 2005

(54) OSPF AUTONOMOUS SYSTEM WITH A BACKBONE DIVIDED INTO TWO SUB-AREAS

(75) Inventors: Claude Galand, La Colle-sur-Loup (FR); Jean-Francois Le Pennec, Nice (FR)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 09/901,441

(22) Filed: Jul. 9, 2001

(65) Prior Publication Data

US 2002/0024934 A1 Feb. 28, 2002

(30) Foreign Application Priority Data

Aug. 29, 2000 (EP) .............................. 00480081

(51) Int. Cl.[7] .............................................. H04L 12/28
(52) U.S. Cl. ........................................ 370/351; 370/401
(58) Field of Search .............................. 370/216, 217, 370/218, 225, 228; 379/221.01; 709/239; 340/2.1, 2.23

(56) References Cited

U.S. PATENT DOCUMENTS

| | | | | |
|---|---|---|---|---|
| 5,452,294 A | * | 9/1995 | Natarajan | 370/351 |
| 5,497,368 A | * | 3/1996 | Reijnierse et al. | 370/351 |
| 6,078,590 A | * | 6/2000 | Farinacci et al. | 370/432 |
| 6,310,878 B1 | * | 10/2001 | Bodnar et al. | 370/396 |
| 6,363,319 B1 | * | 3/2002 | Hsu | 701/202 |
| 6,473,421 B1 | * | 10/2002 | Tappan | 370/351 |
| 6,711,152 B1 | * | 3/2004 | Kalmanek et al. | 370/351 |
| 6,757,258 B1 | * | 6/2004 | Pillay-Esnault | 370/254 |
| 6,778,502 B2 | * | 8/2004 | Ricciulli | 370/238 |
| 6,823,395 B1 | * | 11/2004 | Adolfsson | 709/242 |
| 2002/0021675 A1 | * | 2/2002 | Feldmann | 370/254 |
| 2002/0060986 A1 | * | 5/2002 | Fukushima et al. | 370/218 |
| 2003/0046390 A1 | * | 3/2003 | Ball et al. | 709/224 |

OTHER PUBLICATIONS

G. Apostolopoulus et al.: QoS Routing Mechanism and OSPF Extensions Request for Comments (RFC) 2676, 'Online! Aug. 1999, pp. 1–50, XP002263770.
J. Moy: "OSPF Version 2" Request for Comments (RFC) 2328, 'Online! Apr. 1998, pp. 1–244, XP002263771.

* cited by examiner

Primary Examiner—Hassan Kizou
Assistant Examiner—Hong Sol Cho
(74) Attorney, Agent, or Firm—Duke W. Yee; John R. Pivnichny; James O. Skarsten

(57) ABSTRACT

Data communication system of the type wherein a plurality of contiguous transmission networks constitute an Autonomous System (AS) using the Open Shortest Path First (OSPF) protocol for the exchange of information. The system is divided into several areas including an area 0 or backbone responsible for distributing routing information between the other areas. The backbone is divided into two sub-areas and comprises at least a pair of adjacent splitting routers. The first splitting router is included in one sub-area and the second splitting router is included in the other sub-area. The topological data base of each splitting router is configured to define a high metric for the link between the splitting routers in order to prevent any type of data traffic other than link-state messages (LSA) from being transmitted between the splitting routers.

6 Claims, 5 Drawing Sheets

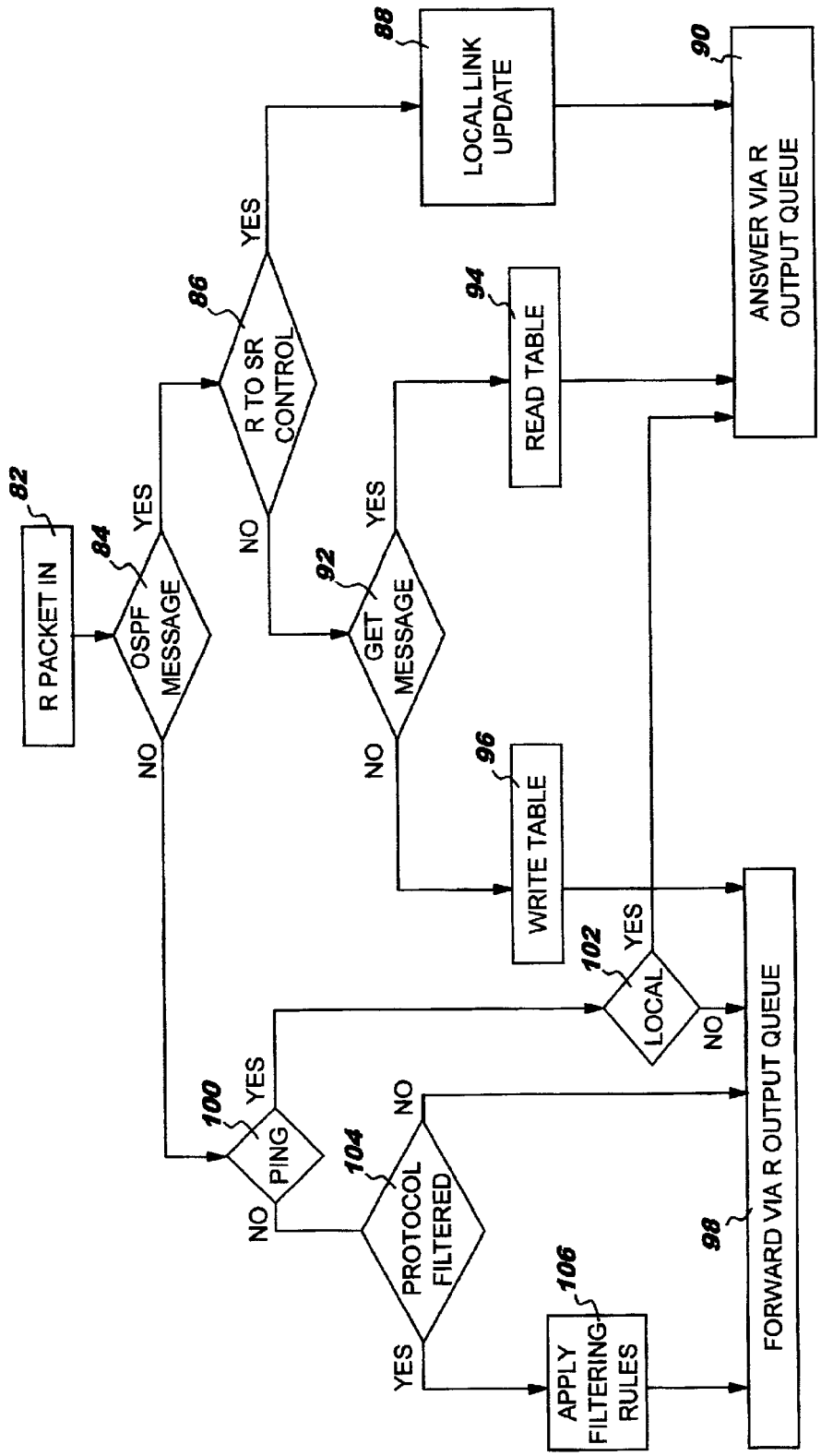

OSPF AUTONOMOUS SYSTEM WITH A BACKBONE DIVIDED INTO TWO SUB-AREAS

TECHNICAL FIELD

The present invention relates to the autonomous systems wherein the routing of data is managed by the OSPF (Open Shortest-Path First) protocol, such systems which comprise a plurality of contiguous IP networks being divided into several areas, and relates in particular to such an autonomous system having a backbone area divided into two sub-areas.

BACKGROUND

Today, a plurality of contiguous networks may be grouped in a large entity called an Autonomous System (AS). The AS is under a common administration that shares a common routing strategy managed by the OSPF (Open Shortest Path First) protocol. OSPF is a link-state routing protocol that calls for sending of link-state advertisements (LSA) to all other routers within a particular area. Such LSAs include information on attached interfaces, metrics being used and other variables.

An AS is generally divided into a number of areas which are groups of contiguous networks and attached hosts. Routers with multiple interfaces can participate in multiple areas; such routers are called area border routers. Each router maintains a data base describing the AS topology. A topological data base is essentially an overall picture of networks in relationship to routers. The topological data base contains the collection of LSAs received from all routers in the same area. Because the routers within the same area share the same information, they have identical topological data bases. Each individual piece of a topological data base is a particular router's local state (e.g. the router's usable interfaces and reachable neighbors).

All routers of a same area run the same algorithm in parallel. From its topological data base, each router constructs a tree of shortest paths with itself as a root. This shortest path tree gives the route to each destination in the AS.

The topology of an area is hidden from the rest of the AS. This information hiding enables a significant reduction in routing traffic. Also, the routing within the area is determined only by the area's own topology lending the area protection from bad routing data. Keeping area topologies separate, OSPF protocol passes less routing traffic than it would pass if the AS was not partitioned. Furthermore, this partitioning creates two different types of OSPF routing, depending on whether the source and destination are in the same areas or are in different areas.

The shortest path first (SPF) routing algorithm is the basis for OSPF operations. After a router is assured that its interfaces are operating, it uses the OSPF Hello protocol to acquire neighbors which are routers with interfaces to a common network. The router sends hello packets to its neighbors and receives their hello packets. In addition to helping acquire neighbors, hello packets also act as means to let routers know what other routers are still functioning.

Among the different areas of the AS, an OSPF backbone (or area 0) is responsible for distributing routing information between areas. As the backbone itself is an OSPF area, all backbone routers use the same procedures and algorithms to maintain routing information within the backbone as the routers of any other area. The backbone topology is invisible to all routers within the other areas.

Stability and redundancy are the most important criteria for the backbone. Stability is increased by keeping the backbone size reasonable. Insofar as every router in the backbone needs to re-compute its routes after every link-state change, keeping the backbone small reduces the likelihood of a change and reduces the amount of CPU cycles required to re-compute the routes.

The main issue when implementing a multi-area OSPF Autonomous System is to have a very reliable backbone since all communications are transmitted through the backbone which, therefore, must be available all the time. A solution to this problem is to duplicate nodes and links, and in particular the routers connecting an area to the backbone called Autonomous System Border Routers (ASBR), which minimizes the risk of an area from becoming disconnected from the backbone. However, such a duplication is not sufficient in view of well known OSPF storms as well as disruptive software upgrades which may prevent the backbone infrastructure from being used part of the time.

SUMMARY OF THE INVENTION

Accordingly, an object of the present invention is to provide an Autonomous System (AS) in which the backbone is divided into two virtual sub-areas and wherein every communication between two areas uses a route which goes through only one of the two sub-areas.

The invention relates therefore to a data communication system of the type wherein a plurality of contiguous transmission networks constitute an Autonomous System (AS) using the Open Shortest Path First (OSPF) protocol for the exchange of information, the system being divided into several areas including an area 0 or backbone responsible for distributing routing information between the other areas, and two contiguous areas being linked by area border routers which maintain each separate topological data base for each area. The backbone is divided into two sub-areas, and comprises at least one pair of a first and a second adjacent splitting routers, with the first splitting router being included in one sub-area and the second splitting router being included in the other sub-area. The topological data base of each splitting router is set up to define a high metric for the link between the splitting routers in order to prevent any type of data traffic other than link-state advertisement messages (LSA) from being transmitted between the splitting routers.

BRIEF DESCRIPTION OF THE DRAWINGS

The above and other objects, features and advantages of the invention will be better understood by reading the following more particular description of the invention in conjunction with the accompanying drawings wherein:

FIG. 5 is a flow chart of the packet processing in a splitting router when the packet is received on the interface between the splitting router and a router of the sub-area.

DETAILED DESCRIPTION OF THE INVENTION

Figure 1:
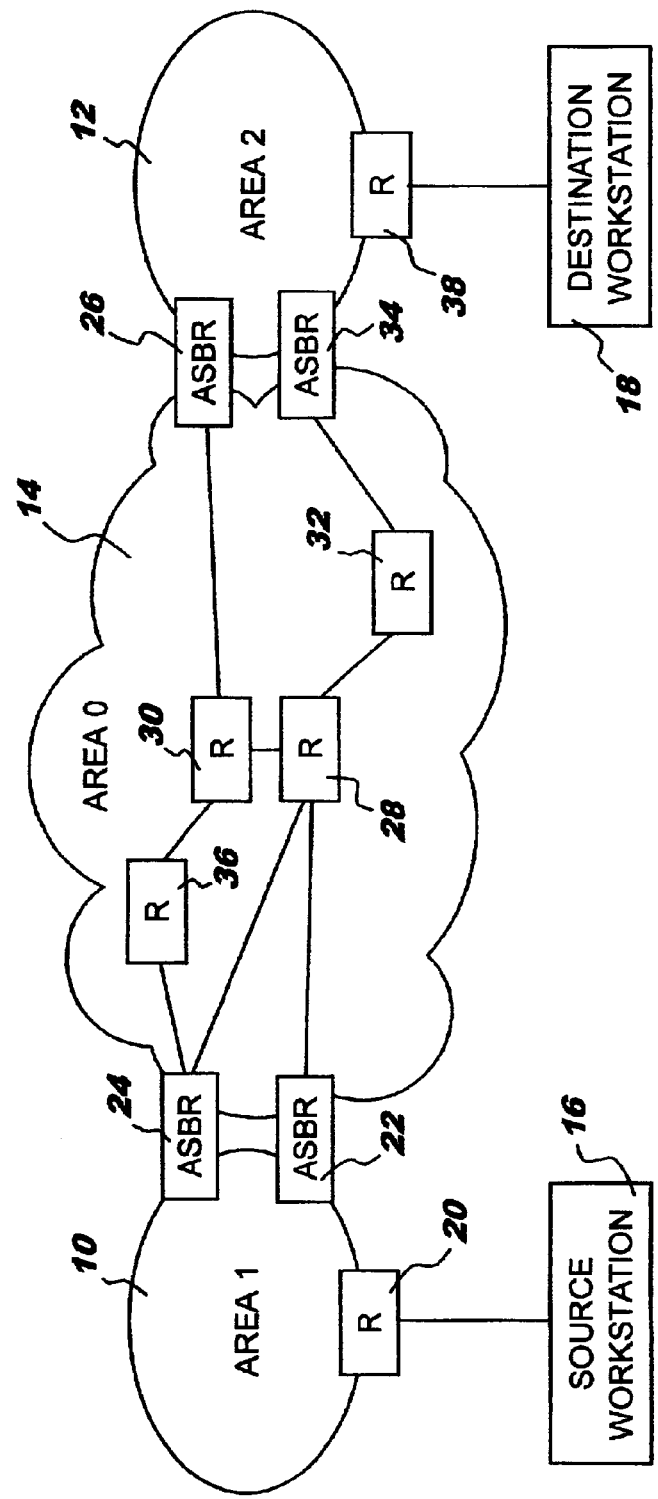
FIG. 1 represents schematically a standard autonomous system including two areas and a backbone.

FIG. 1 represents a standard Autonomous System (AS) using the Open Shortest Path First (OSPF) protocol which is divided into three areas, a first area 10, a second area 12 and an area 0 or backbone 14. When a source workstation 16 wants to exchange data with a destination workstation 18, it may use several routes. The path goes through router 20 in area 10 and then goes through backbone 14 either through Autonomous System Border Router (ASBR) 22 or ASBR 24 depending on the shortest path defined in the routing data base of router 20. When using ASBR 22, the path to area 12 may exit the backbone 14 and enter area 12 either by ASBR 26 through intermediate routers 28 and 30 or by ASBR 34 through intermediate routers 28 and 32. When using ASBR 24, the path to area 12 may exit the backbone 14 and enter area 12 either by ASBR 26 through intermediate routers 36 and 30 or by ASBR 34 through intermediate routers 28 and 32.

Note that the choice between several paths is determined by the metrics which are associated with the links between the routers. Finally, the path from ASBR 26 or ASBR 34 to destination workstation 18 is made through router 38.

Figure 2:
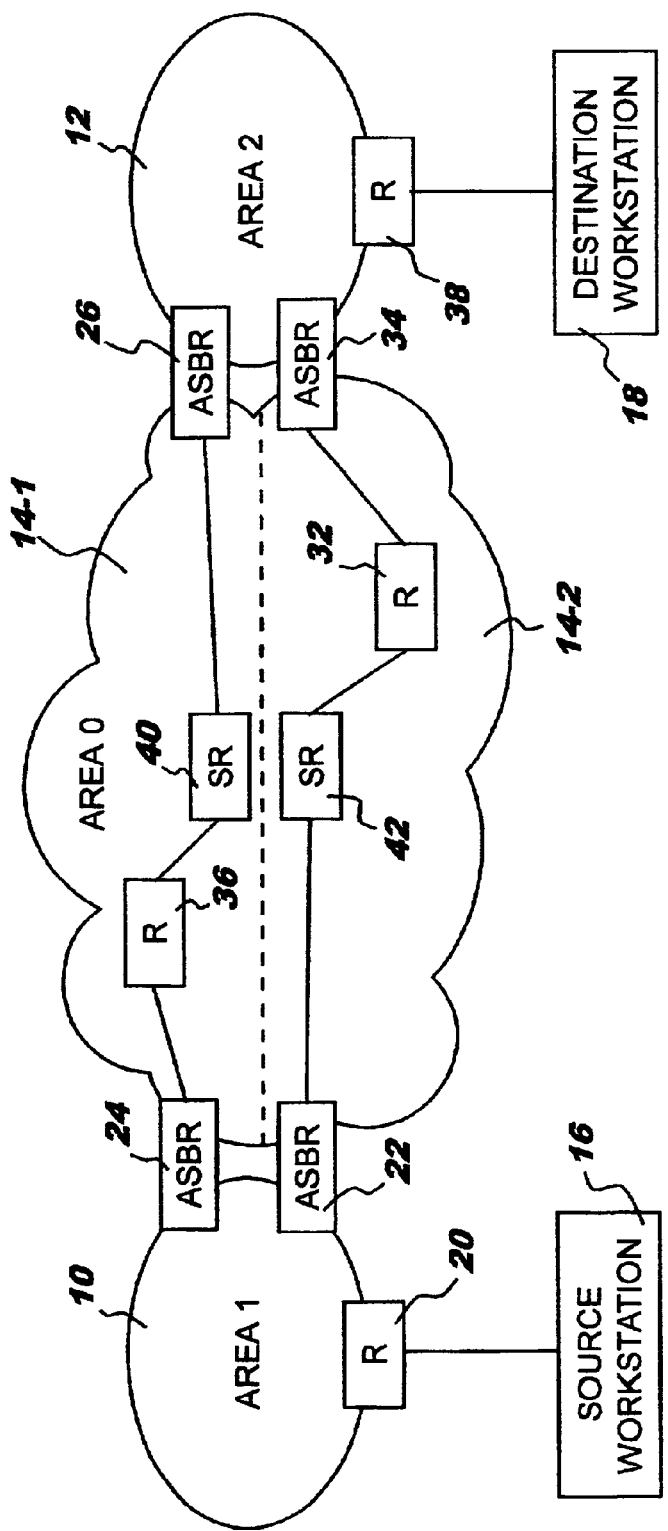
FIG. 2 represents schematically an autonomous system including two areas and a backbone divided into two sub-areas according to the invention.

According to the invention, the AS illustrated in FIG. 2 is the same system as the one of FIG. 1 wherein backbone 14 has been divided into two sub-areas 14-1 and 14-2 separated by a dotted line.

According to the invention, a pair of adjacent splitting routers (SR) 40 and 42 are located respectively in each sub-area 14-1 and 14-2. These routers insure the continuity of the OSPF communications but block data traffic between the two sub-areas. Note that it is possible to have more than one pair of splitting routers to implement the system according to the invention.

Source workstation 16 may use several routes to reach destination workstation 18, but the number of these routes is limited. Thus, if the traffic from source workstation 16 enters via ASBR 22, it can only enter area 12 via ASBR 34 as all data routes to ASBR 26 will be dissuasive. A possible route is through routers 42 and 32. Similarly, if the traffic from source workstation 16 enters via ASBR 24, it can only exit the area 0 and enter area 12 via ASBR 26 as all data routes to ASBR 34 will be dissuasive. A possible route is through routers 36 and 40.

An essential feature of the invention is that the cost of the link between SR 40 and SR 42 is set at a very high value in the routing data base irrespective of traffic type. Link state advertisement (LSA) messages transmit this high cost to minimize the traffic that may transit between these splitting routers. Routers, when building their own SPF trees, will have a very low probability of using this link in their data path. To accomplish this, routing information such as LSA is not allowed to flow in order to maintain the area 0 coherence, but data base parameters may be set to virtual values to induce behavior as if area 0 were really divided.

Figure 3:
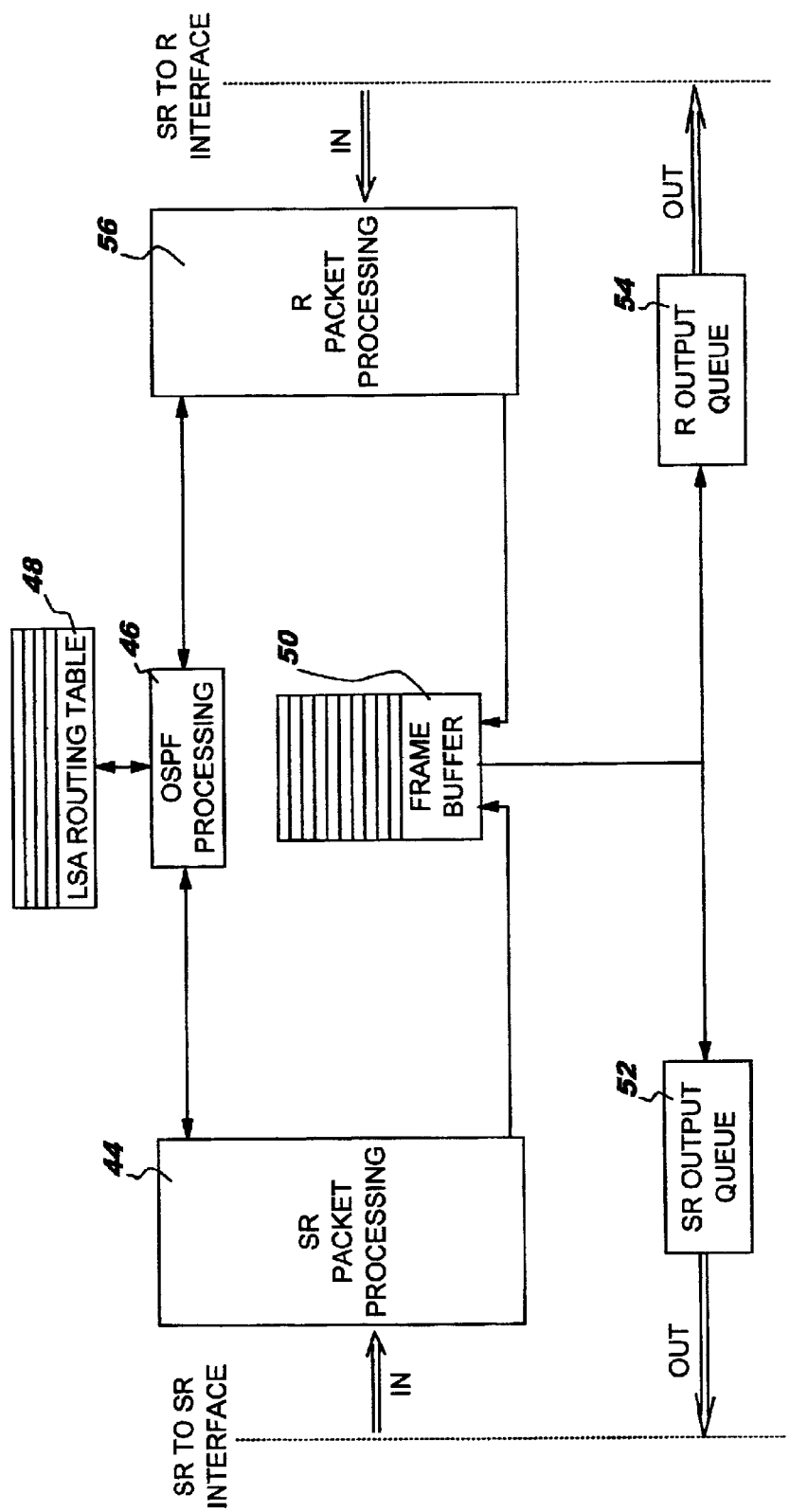
FIG. 3 is block diagram of a splitting router used in an autonomous system according to the invention.

Each splitting router 40 or 42 includes a functional block which is schematically illustrated in FIG. 3. Such a functional block includes one interface with the linked splitting router of the other sub-area (SR to SR interface) and one or several interfaces with the routers included in the same sub-area and directly linked to the splitting router being considered (SR to R interface).

When a frame arrives on the SR to SR interface, a first identification occurs in SR packet processing unit 44 to check whether it is an OSPF message such as a Hello packet. If so, the packet is forwarded to OSPF processing unit 46 which updates LSA routing table (topological data base) 48 or takes information from this table to send it to SR packet processing unit 44 for transmission via frame buffer 50 to either SR output queue 52 if it is an answer to a Hello message or to R output queue 54 if a Hello message needs to be transmitted to other routers of the sub-area. Other types of packets received by SR packet processing 44 are transmitted via frame buffer 50 to the appropriate SR to SR interface or SR to R interface, or are filtered according to rules defined by the administrator of the AS. For example, filtering rules may be to block the corresponding flow or to delay it.

At this point, it is useful to recall that OSPF link state advertisements (LSA) contained in Hello messages specify the metrics to be used. In LSA's, the metrics indicate the cost of each link in a described path. Generally, each link is given a metric based by default on its bandwidth. The metric for a specific link is the inverse of the bandwidth for this link. The metric for a route is the sum of the metrics for all the links of the route. The cost (corresponding to the metric) of an interface in OSPF is an indication of the overhead needed to send packets across this interface, and is therefore inversely proportional to the bandwidth of the interface.

According to the invention, the administrator of the AS sets up a very high cost for the link between the two splitting routers by transmitting to the LSA routing table of each splitting router Hello messages containing virtual LSAs indicating a narrow bandwidth (e.g. 56 k bytes or less rather than 10 M bytes). It must be noted that other metrics such as Type Of Service (TOS) may be used to build LSA routing tables of the splitting routers. In such a case, the TOS bits are modified in order to filter services that may not use the link between the splitting routers.

When a frame arrives on the SR to R interface, a first identification occurs in R packet processing unit 56 to check whether it is an OSPF message such as a Hello packet. If so, the packet is forwarded to OSPF processing unit 46 which updates LSA routing table (topological data base) 48 or takes information from this table to send it to R packet processing unit 56 for transmission via frame buffer 50 to either R output queue 54 if it is an answer to a Hello message or to SR output queue 52 if a Hello message needs to be transmitted to other routers of the sub-area. Other types of packets received by R packet processing unit 56 are transmitted via frame buffer 50 to the appropriate SR interface to SR interface or SR to R interface, or are filtered according to rules defined by the administrator of the AS.

The objective of the above is to prevent most of the frames coming from another router within the same sub-area to go through the splitting router toward the linked splitting router of the other sub-area. Nevertheless, some packets may be authorized to transit such as ICMP packets or SNMP packets if a dedicated network management is implemented on each sub-area. In fact, there may be access lists authorizing some source workstations to go through the splitting routers whereas filtering other ones. The filtering may be dynamically changed to take network changes into account.

Figure 4:
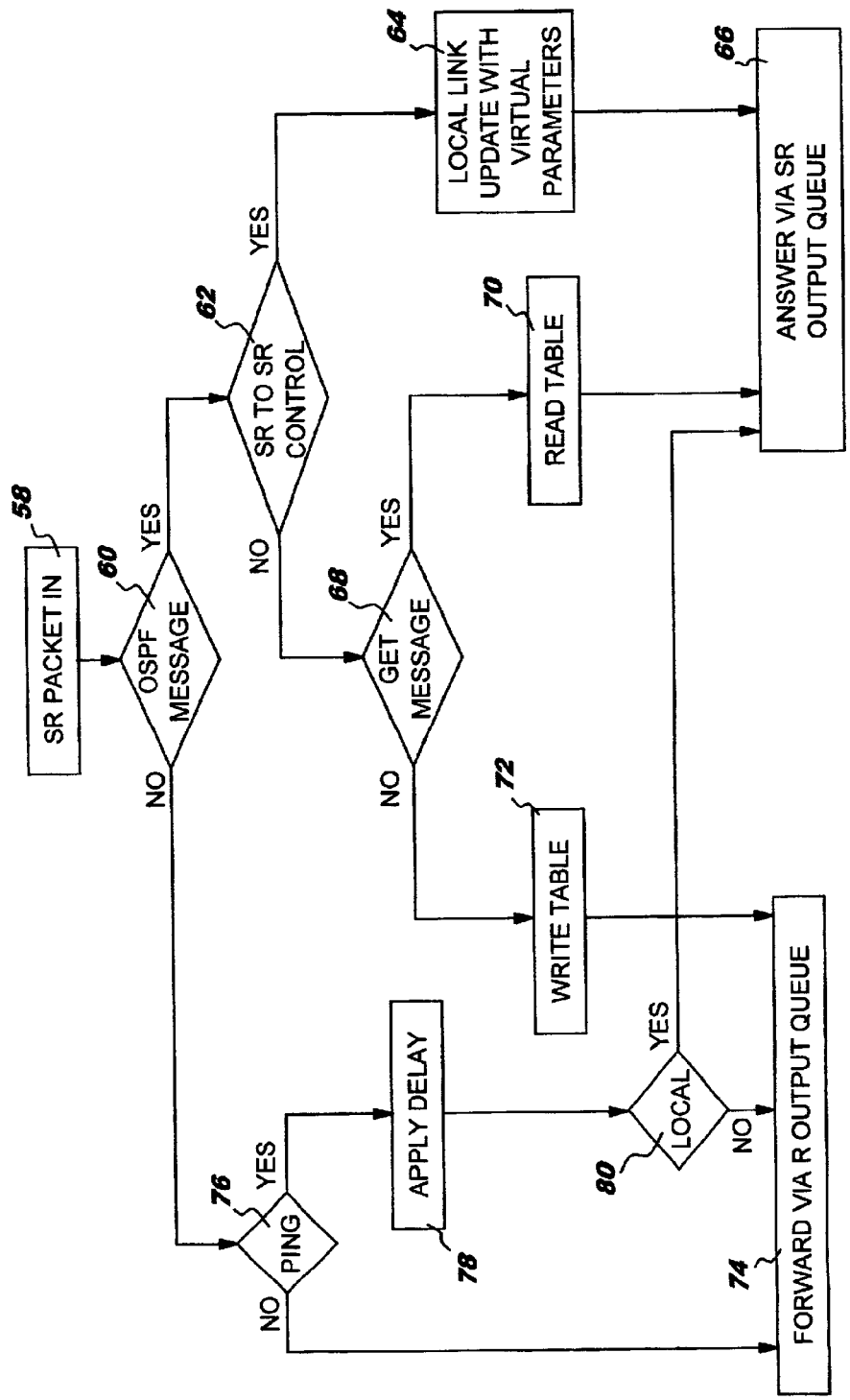
FIG. 4 is a flow chart of the packet processing in a splitting router when the packet is received on the interface between the two splitting routers.

The different steps which are implemented by the functional block of a splitting router are represented in FIG. 4 and FIG. 5 when a packet is received respectively on SR to SR interface or SR to R Interface.

Referring to FIG. 4, when a packet comes from the SR to SR interface (step 58), it is checked whether it is a Hello packet (OSPF control message) (step 60). If so, it is checked whether it is a control message between the two splitting routers for agreeing or updating virtual parameters such as the link metric (step 62). If so, the specified action is taken (step 64) and an update confirmation message is sent on the SR output queue (step 66). If it is an update for other links/devices or a request for getting table contents, the normal Hello message process is performed. In such a case, it is determined whether the message is a get message (step 68). If so, the routing table is read (step 70), and an answer Hello message is built and sent back to the requester via the SR output queue (step 66). When it is not a get message, an update is performed by a write table (step 72). Then, an update message is forwarded to neighbor devices by putting it on the R output queue (step 74).

When the message received on the SR to SR interface is not a Hello message, it is determined whether this message is a Ping (ICMP protocol) (step 76). It must be noted that a Ping is a message sent to a specified destination host as an "echo" message used in the ICMP protocol. Such a message requests an "echo reply" message from the destination host for measuring the round trip time. Ping messages constitute an important feature of the invention insofar as a delay is artificially added in the splitting router to simulate a link having bad performance. The purpose of this function is to prevent the other routers in the AS from using this route. Thus, delay and throughput of the link can also be taken into account even though the virtual metric stored in the routing table is very high as explained above.

Therefore, if the message is a Ping message, a delay is applied (step 78) by retaining the message in a buffer for a predefined time. Then, it is determined whether the Ping destination address is the local splitting router or another splitting router located in the other sub-area (step 80). If the destination is the local splitting router, it is put in the SR output queue (step 66). Otherwise, it is put in the R output queue (Step 74).

Referring to FIG. 5, when a packet comes from the SR to R interface (step 82), it is checked whether it is a Hello packet (OSPF control message) (step 84). If so, it is checked whether it is a control message between the two routers for agreeing or updating real parameters such as the link metric (step 86). If so, the specification is taken (step 88) and an update confirmation message is sent on the R output queue (step 90). If it is an update for other links/devises or a request for getting table contents, the normal Hello message process is performed. In such a case, it is determined whether the message is a get message (step 92). If so, the routing table is read (step 94), and an answer Hello message is built and sent back to the requester via the R output queue (step 90). When it is not a get message, an update is performed by a write table (step 96). Then, an update message is forwarded to neighbor devices by putting it on the R output queue (step 98).

When the message received on the SR to R interface is not a Hello message, it is determined whether it is a Ping message (step 100). If so, it is then determined whether the Ping destination address is the local splitting router or another router in the other sub-area (step 102). If the destination is the local splitting router, the message is put in the R output queue (step 90). Otherwise, it is put in the SR output queue (step 98).

If the received message is neither an OSPF message nor a Ping message, it is determined whether it has to be filtered by a firewall function (step 104). If so, filtering rules are applied (step 106) and then, the packet is sent to the SR output queue (step 98). If it is not the case, the packet is also sent to the SR output queue without applying filtering rules thereto. Note that the filtering rules may be based on the protocol number, the source and/or the destination address as any legacy firewall. This filtering allows also to dynamically open doors for some traffic when necessary, such as management flows. For example, it can prevent software updates from being propagated on all the area to avoid the AS to completely fall down due to a bad level update. Data traffic may also be filtered if necessary to have two separate data networks in area 0 but may be open in some sub-area failure cases.

We claim:

1. A splitting router suitable for use in an autonomous system communication network that employs Open Shortest Path First protocol for communicating information, the splitting router comprising:

a topological database;

an Open Shortest Path First processing unit for updating the topological database in response to link state messages;

a splitting router packet processing unit for processing messages received over a link that connects the first splitting router and a second splitting router, and forwarding to the Open Shortest Path First processing unit hello messages received over the link that connects the first splitting router and the second splitting router;

a router packet processing unit for processing messages received over a sub-area network to which the splitting router is connected that is a sub-area of a backbone network, and forwarding to the Open Shortest Path First processing unit hello messages received over the sub-area network to which the splitting router is connected; and a buffer for buffering messages output by the splitting router packet processing unit and the router packet processing unit.

2. The splitting router of claim 1, further comprising:

a splitting router output queue for receiving messages from the buffer and queuing messages received from the buffer in preparation for sending messages received from the buffer over the link connecting the first splitting router and the second splitting router; and a router output queue for receiving messages from the buffer and queuing messages received from the buffer in preparation for sending messages received from the buffer over the sub-area network to which the splitting router is connected.

3. A routing method suitable for an autonomous system communication network that employs Open Shortest Path First protocol for communicating information, comprising the act of configuring at least one metric in a topological database to allow passage of link state messages on a link between a first splitting router connected to a first sub-area network and a second splitting router connected to a second sub-area network and to substantially block from passage on the link between the first splitting router and the second splitting router messages that are not link state messages, wherein the metric comprises a measure of round-trip delay experienced by a ping message, and further wherein the measure of round-trip delay is purposefully increased above the delay actually experienced when the ping message is exchanged between the first splitting router and the second splitting router.

4. The method of claim 3, wherein the metric comprises a specification of bandwidth on the link between the first splitting router and the second splitting router.

5. The method of claim 3, wherin the act of configuring is responsive to filtering based on Type of Service.

6. The method of claim 3, wherein the metric comprises a measure of round-trip delay experienced by a ping message, and further wherein the round-trip delay experienced by the ping message is purposefully increased by buffering the ping message for a predetermined time when the ping message is exchanged between the first splitting router and the second splitting router.

* * * * *